United States Patent
Evsenin (10) Patent No.: US 12,474,467 B2
(45) Date of Patent: Nov. 18, 2025

(54) HUMAN SECURITY SCANNER

(71) Applicant: APSTEC Systems Ltd, Iklin (MT)

(72) Inventor: Aleksei Evsenin, Tallinn (EE)

(73) Assignee: APSTEC Systems Ltd, Iklin (MT)

( * ) Notice: Subject to any disclaimer, the term of this patent is extended or adjusted under 35 U.S.C. 154(b) by 399 days.

(21) Appl. No.: 18/120,531

(22) Filed: Mar. 13, 2023

(65) Prior Publication Data

US 2024/0310512 A1    Sep. 19, 2024

(51) Int. Cl.
| | |
|---|---|
| *G01S 13/88* | (2006.01) |
| *G01S 7/02* | (2006.01) |
| *G01S 7/41* | (2006.01) |
| *G01S 13/86* | (2006.01) |
| *G01S 13/89* | (2006.01) |
| G01S 13/90 | (2006.01) |

(52) U.S. Cl.
CPC ............ *G01S 13/887* (2013.01); *G01S 7/025* (2013.01); *G01S 7/41* (2013.01); *G01S 13/86* (2013.01); *G01S 13/89* (2013.01); G01S 13/9064 (2019.05)

(58) Field of Classification Search
CPC .......... G01S 13/887; G01S 7/025; G01S 7/41; G01S 13/86; G01S 13/867; G01S 13/89; G01S 13/9064; G06V 10/764; G06V 10/80; G06V 2201/05
See application file for complete search history.

(56) References Cited

U.S. PATENT DOCUMENTS

| | | | |
|---|---|---|---|
| 7,948,428 B2 * | 5/2011 | Lovberg | H01Q 21/064 |
| | | | 342/22 |
| 9,316,732 B1 * | 4/2016 | Mohamadi | G01S 13/0209 |
| 9,329,138 B2 * | 5/2016 | Kuznetsov | G01N 33/227 |
| 9,784,879 B2 * | 10/2017 | Kuznetsov | G01V 3/12 |
| 10,209,387 B2 * | 2/2019 | Kayano | G01V 3/38 |
| 10,585,185 B2 * | 3/2020 | Ahmed | G01S 13/887 |
| 10,795,046 B2 * | 10/2020 | Moynihan | G01V 5/223 |
| 2004/0090359 A1 * | 5/2004 | McMakin | G01S 13/89 |
| | | | 342/44 |
| 2004/0140924 A1 * | 7/2004 | Keller | G01N 21/3563 |
| | | | 342/179 |

(Continued)

FOREIGN PATENT DOCUMENTS

EP         3071956 B1 *  11/2021  ........... G01S 13/003

OTHER PUBLICATIONS

Z. Wang, T. Chang and H.-L. Cui, "Review of Active Millimeter Wave Imaging Techniques for Personnel Security Screening," in IEEE Access, vol. 7, pp. 148336-148350, 2019, doi: 10.1109/ACCESS.2019.2946736 (Year: 2019).*

*Primary Examiner* — Matthew M Barker
(74) *Attorney, Agent, or Firm* — Nadya Reingand (57) ABSTRACT

The disclosed invention comprises a security screening system and device for detecting and classifying items concealed on the body of a moving or stationary person, as well as in carried or wheeled luggage, in real time. The invention combines radio wave technology, magnetometer technology, and optical sensors to detect dielectric and/or metal objects on targets moving through the portal formed by the invention. The sensed data is then sent to a calculation processor of the system which forms 2-D images to determine the type of object, the location of the object, and other additional information relating to the target and/or object.

14 Claims, 4 Drawing Sheets

(56) References Cited

U.S. PATENT DOCUMENTS

| | | | |
|---|---|---|---|
| 2005/0251018 A1* | 11/2005 | Gleman | G01S 13/89 |
| | | | 600/407 |
| 2006/0017605 A1* | 1/2006 | Lovberg | G01K 7/226 |
| | | | 342/179 |
| 2006/0066469 A1* | 3/2006 | Foote | G06T 19/00 |
| | | | 342/179 |
| 2007/0263907 A1* | 11/2007 | McMakin | G06V 40/25 |
| | | | 382/107 |
| 2016/0216371 A1* | 7/2016 | Ahmed | G01S 13/89 |
| 2016/0356886 A1* | 12/2016 | Valdes | G01S 13/003 |
| 2017/0160419 A1* | 6/2017 | Kuznetsov | G01V 3/12 |
| 2018/0173161 A1* | 6/2018 | Chen | G01V 8/005 |
| 2020/0142053 A1* | 5/2020 | Qi | G01S 13/89 |
| 2020/0320731 A1* | 10/2020 | Sheen | G06F 3/04815 |
| 2021/0181328 A1* | 6/2021 | Hayashi | G01S 17/04 |
| 2021/0341338 A1* | 11/2021 | Shtrom | A61B 5/746 |
| 2022/0107407 A1* | 4/2022 | Zhu | G01S 13/9064 |
| 2024/0094383 A1* | 3/2024 | Mori | G01S 13/86 |
| 2024/0183976 A1* | 6/2024 | Pedross-Engel | G01S 13/90 |
| 2024/0280682 A1* | 8/2024 | Zhang | G01S 13/48 |

* cited by examiner

SIDE VIEW

HUMAN SECURITY SCANNER

FIELD OF THE INVENTION

The invention relates to security screening and the detection of concealed dielectric and metal objects carried by individuals or in luggage.

BACKGROUND OF THE INVENTION

The closest threat detection system to the present invention is the Rapiscan Systems Secure 1000 SP. The Secure 1000 SP uses backscatter technology as well as image processing software and an operator interface to screen passengers for a wide range of potential threats including liquids, contraband, ceramics, explosives, narcotics, concealed currency and weapons. The Secure 1000 SP generates a front and back scan simultaneously. The Secure 1000 SP can detect small objects and threats concealed on a passenger. It can detect organic and inorganic threats, metals and non-metallic objects and can detect concealed liquids, ceramics, weapons, plastic explosives, narcotics, metals, contraband, currency etc. The Secure 1000 SP requires one pose with no additional movement by the passenger, a full scan can be completed in seconds. The Secure 1000 SP bounces very low dose of x-rays off of a person to generate an image. This image is then analyzed by an operator to identify concealed potential threats.

The Rapiscan Systems Secure 1000 SP is limited in that it requires a person to be in a single pose for scanning, it requires an operator to determine what threats are present and to review the scanned images, it uses x-rays for scanning, it only performs backscatter and no pass through imaging, at it is designed to work at a security checkpoint as opposed to use in an array where it can scan multiple individuals and their luggage without causing a security bottleneck. The Rapiscan Systems Secure 1000 SP is incapable of detecting radiation/nuclear materials.

There is a need for lower cost multi-threat detection systems with very short processing time allowing for the detection of a variety of threats simultaneously.

SUMMARY OF THE INVENTION

The invention comprises security screening devices, systems, and methods, comprising: a portal, said portal comprising two side pillars electronically connected preferably with either an overhead beam (i.e., arch) or a floor/underfloor cable duct, said portal forming an inspection area, each one of said two side pillars comprising a linear array of two or more millimeter-wave emitters, preferably of 16-256 millimeter-wave emitters; a linear array of two or more millimeter-wave receivers, may also preferably including one or more magnetometers, one or more video cameras, a radio frequency generation, distribution and demodulation module, and a data acquisition processor and an imaging processor, said overhead beam (or a separate third pillar, if no overhead beam) comprising a power input system and a calculation processor, said emitters transmitting cyclic broadband radio wave signals towards two or more said receivers located either on an opposite one of said two side pillars or on the same side pillar, said receivers sensing said cyclic broadband radio wave signals, said cyclic broadband radio wave signals being direct signals unimpacted by a moving target moving inside the inspection area (unimpacted direct signals), or signals transmitted through the moving target moving through the inspection area (transmitted signals), or scattered signals reflected back after impacting the moving target moving through said inspection area (reflected back signals), said receivers sending sensed signals to the data acquisition processor then to the imaging processor, the imaging processor providing one or more 2-dimensional images of said moving target based on said unimpacted direct signals or said transmitted signals and said reflected signals, further selection of one or more sections of said one or more 2-dimensional images is provided, said one or more sections corresponding to one or more detected concealed item of interest, said one or more magnetometers providing supplemental magnetic field data, and said one or more video cameras tracking said concealed item of interest.

BRIEF DESCRIPTION OF THE DRAWINGS

The invention is illustrated by the following drawings.

DETAILED DESCRIPTION OF THE PREFERRED EMBODIMENT

Definitions

The present patent application deals with millimeter-wave emitters that irradiate the range 0.3-300 GHz and receivers receive radiation in this range. The preferred operation range is 10-20 GHz.

Figure 1:
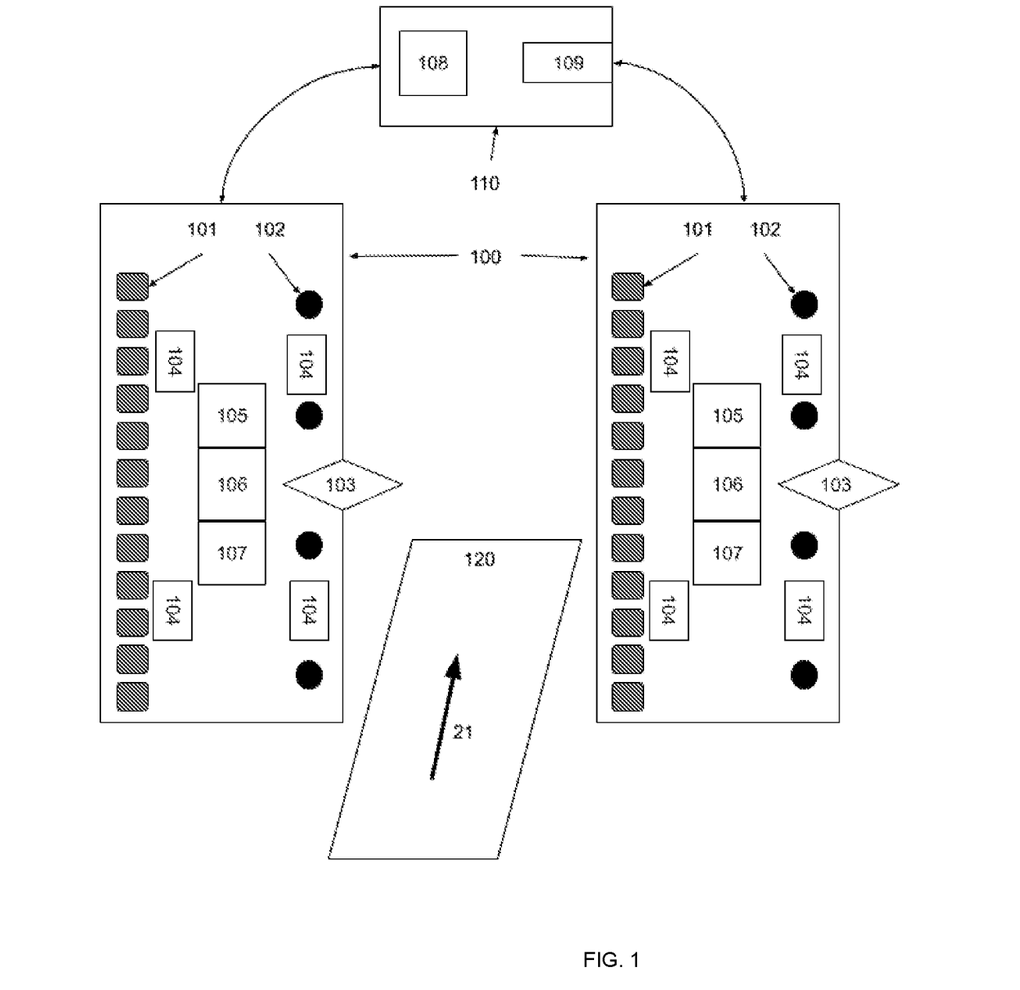
FIG. 1 shows an exemplary diagram of the portal according to the present invention.
Figure 2:
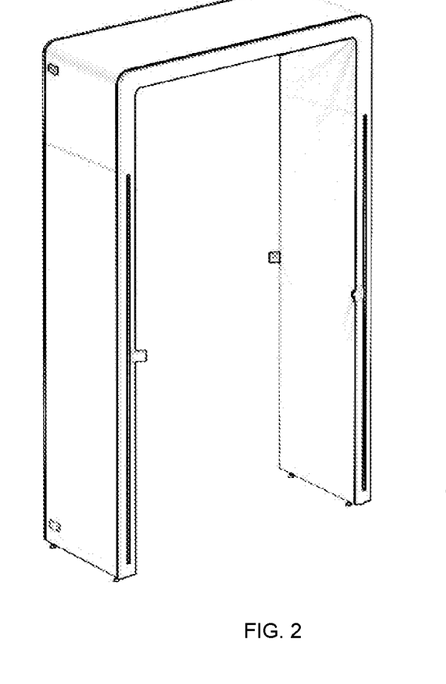
FIG. 2 shows an embodiment of the present invention with an overhead beam.
Figure 2A:
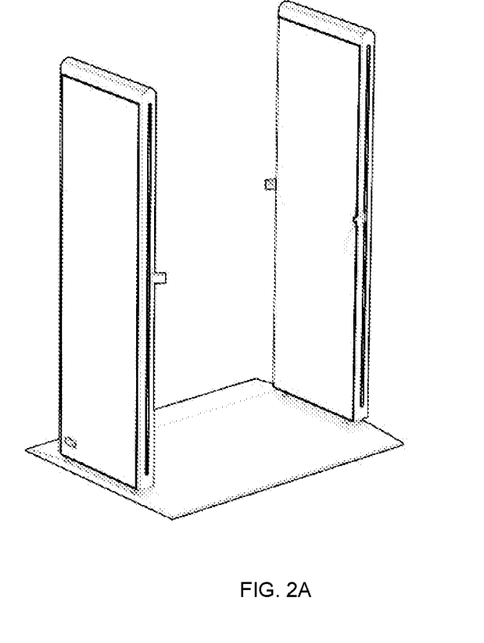
FIG. 2A shows an embodiment of the present invention without an overhead beam.

The present invention is implemented in the form of a portal structure having side pillars 100 and an optional overhead beam 110 connecting said side pillars. The portal has a height of 1.5-2.5 meters. The side pillars each comprise a vertical linear array of transceiver antennas 101 (two or more millimeter-wave emitters), a vertical linear array of sensors 102 (two or more millimeter-wave receivers) with corresponding electronic components (e.g., radio frequency generation, distribution and demodulation module 105, data acquisition processor 106, imaging processor 107), one or more magnetometers 104, and one or more video cameras 103, and the horizontal overhead beam (or a floor duct, or a third separate pillar) comprises the power input system 108 and the calculation processor 109.

Detection of concealed items 22 hidden on a moving target, performed by the device is based on at least one or two combined technologies:

1. Dielectric object detection is performed as each target moves through the opening created by the device, via active sensing using coherent radiation, said coherent radiation having a continuously changing frequency ranging between 5-20 GHz. The transmitted cyclic broadband radio wave signals vary in time, in frequency, or both in time and in frequency. Through such radiation and variation, the inventive device forms a computer image of a moving target/individual and associated dielectric objects located on or near the target's body. The system performing this function is referred to herein as the microwave dielectric detection (MDD) subsystem of the invention. The system performs detection of concealed items with an optical path length of 2-20 cm hidden on a moving target. The optical path length (OPL) in a medium with a constant refractive index "n", is equal to "ns", where "s" is the geometrical length.

Optionally, the emitters are positioned in a vertical line with an equal spacing between one another, and the receivers are positioned in a vertical line with an equal spacing between one another.

The emitters transmit and the receivers sense the broadband radio wave signals in one linear polarization or in two orthogonal polarizations.

The sensed signals are received by the data acquisition processor, which creates an image stream from the sensed data. The data acquisition and imaging processor provides a separation of a phase of the cyclic broadband radio wave signals. The imaging processor provides cross-eyed images of the target based on a location of the emitters and the receivers on both sides of the inspection area.

2. Passive magnetometry (PM) is implemented alongside the microwave dielectric detection subsystem for the supplemental detection of metal objects having a residual magnetization. The system performing this function is referred to herein as the passive magnetometer (PM) subsystem of the invention.

In addition to these two technologies, detected object tracking is performed by a third technology which includes a video camera subsystem designed for providing video fixation of the target/individual once an alarm detecting a hidden object occurs. The processor processes and analyzes the optical image flow. The processing includes classifications for each target based on a joint analysis of optical data, magnetometer data, and radio wave data.

Structural Composition of the Device.

FIG. 1 shows the functional diagram of the inventive device. Each of the side pillars house MDD subsystem components (transmitting and receiving antennas, data processing board, FPGA chip board) and the PM subsystem components. Each side pillar also houses two video cameras each and a pillar-mounted computer which performs some of the data processing and data acquisition operations. The arch/overhead beam comprises an arch computer, said arch computer being responsible for the final data processing operations. The arch/overhead beam further comprises auxiliary modules including the power supply and networking components. The side pillars are connected to the arch with connectors which provide for data exchange between the arch and each side pillar, as well as between the two side pillars. If no overhead beam/arch is utilized, the side pillars may be connected, e.g., via a floor/under-floor cable duct. Said cable duct may also house the calculation processor and/or the power input system.

MDD Subsystem.

The MDD subsystem comprises a low-power radar system with inverse synthetic aperture (ISAR—Inverse synthetic-aperture), which uses the motion of the target, rather than the transmitter, to create a synthetic aperture (see, e.g., Grishin Yu. P., Ipatov V. P. et al. "Radiotechnical Systems," Edited by Yu. M. Kazarinov, 1990).

Each side pillar of the inventive device contains a vertical linear array of 16-128 transmitting antennas and 1-128 receiving antennas, all of which are evenly distributed along the height of each side pillar of the device. After the analysis of the received signals (both direct and reflected signals from objects and targets within the detection area), a flat 2-D image of the inspection area, in coordinates of height and range, is formed. The range values are determined from the analysis of the broadband signal, and the height values are determined from the analysis of the signals emitted by the vertical line of transmitting antennas. The system has no horizontal axis resolution, and it is assumed that there is one person in the inspection area at a time. Signal processing is performed according to "reverse synthesized aperture" algorithms on FPGA chips, using "fast time" and "slow time" Fourier transform and window filters.

The receiving and transmitting antennas of the inventive device are made by planar technology and provide the required characteristics in the frequency range of 10-20 GHz. The radiated power throughout the device remains around −40 dBm.

The MDD subsystem operates in two modes:
1. reflection mode of radio waves;
2. transmission mode of radio waves.

Reflection mode is based on the fact that the human body is almost a perfect reflector for radio waves of the frequency range used. If there is a dielectric item against the body in the path of the radio wave, part of the wave is reflected from the front surface of the dielectric, and part of the wave passes through the dielectric and is then reflected from the body. See FIG. 3, which shows the principle of operation of the reflection mode, as well as an example image generated. In the example image, on the horizontal axis is the distance traveled by the wave, and on the vertical axis is the number of the transmitter in the vertical ruler.

Figure 3:
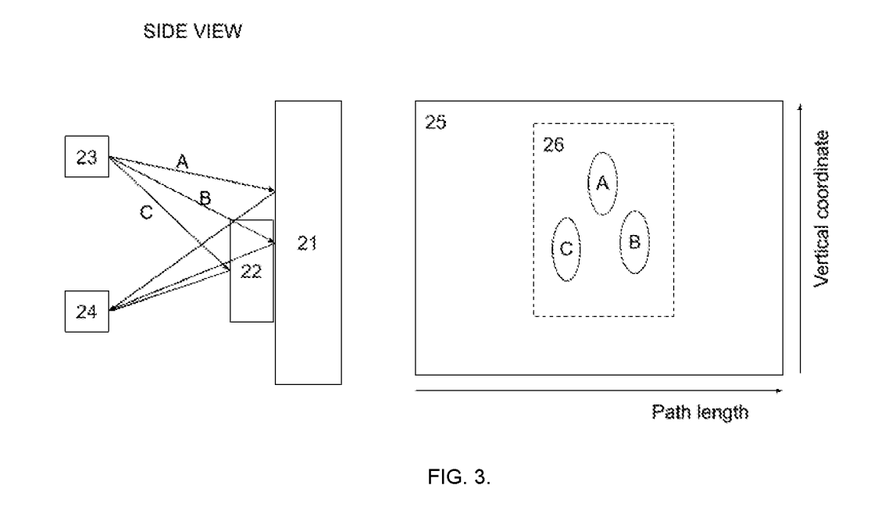
FIG. 3 shows a schematic view of the image obtained from a dielectric attached to the body in the "reflection" mode. 21—body; 22—dielectric; 23—emitter; 24—receiver; 25—2D image; 26—selected pattern; A—the radio wave reflected from the body; B—the radio wave reflected from the body after passing through the dielectric; C—the radio wave reflected from the dielectric.

In the reflection mode, due to the fact that the speed of propagation of radio waves in the dielectric is less than the speed of light in the air, there is a delay in the arrival of the reflected wave to the receiver. This lag is interpreted as an additional path taken by the wave before reflection, and thus the image of the rear surface of the dielectric is "pressed" into the surrounding body image. The example generated image of FIG. 3 shows the area of wave reflection from the front and back surfaces of the dielectric on the belt. Above and below this area there is only one reflective surface: the top of the torso and part of the forward leg. The fact of the presence of the front and back dielectric surfaces in the microwave image is thus interpreted as an anomaly.

Figure 4:
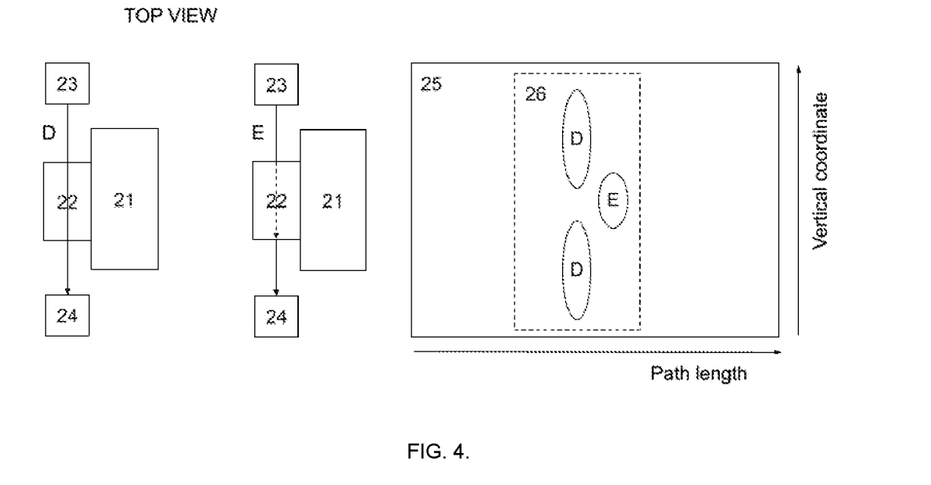
FIG. 4 shows Schematic view of the image obtained from a dielectric attached to the body in the "transmission" mode. 21—body; 22—dielectric; 23—emitter; 24—receiver 25—2D image; 26—selected pattern; D—the radio wave passing above or below the dielectric; E—the radio wave passing through the dielectric.

The transmission mode is based on the fact that as a radio wave passes from the transmitters of one side pillar to the receivers of the other side pillar, through the dielectric object, the apparent path length of the wave increases due to its slower propagation through the dielectric (see the left side of FIG. 4). This causes the image in the dielectric region to be shifted to the right into the region of longer paths (see the right side of FIG. 4). In FIG. 4, the left side shows the principle of operation of the "passing through" mode. On the right side of FIG. 4 is an example image of a person with a dielectric on the body. On the horizontal axis is the distance travelled by the wave, and on the vertical axis is the number of the transmitter based on the height of the side pillar. The detection of a right-shifted image portion within the microwave image is thus interpreted as an anomaly.

The reflection and passage of the anomaly obtained from the device is further aggregated throughout the moving target's passage through the entire inspection area, and the resulting data is used to issue an overall detection signal/alarm.

As a target moves through the inspection area with a speed of 1-3 m/s, the device sequentially searches the person in the following order:
1. as the target approaches the device and the plane of transmitters-receivers, the front part of the body is screened using the reflection mode;
2. when the target crosses the initial plane of transmitters-receivers, the front part of the body is screened using the transmission mode;
3. before the target passes the final plane of transmitters-receivers, the back part of the body is screened using the transmission mode;
4. after the target passes the initial plane of transmitters-receivers, the back part of the body is screened using the reflection mode;
5. while the target remains within the plane of transmitters-receivers, the side parts of the body are screened using the reflection mode.

Since there are two transmitter-receiver planes in the system (transmitters left+receivers right, transmitters right+receivers left), the above inspection sequence occurs twice simultaneously (i.e., once from each side).

The wavelength of the transmitter is about of 30 mm. For efficient selection of parts of the moving person, the radiation phase correlation is required, which means that during the scanning period, a part of the human body should not move more than a few mm. Therefore, the scan period should not exceed a few ms, for example, the scan period is 2 ms. If the number of emitters is 128, then 1 emitter should generate a signal of about 20 µs duration. In order to achieve the required image contrast (which corresponds to the required path length resolution of 1-3 mm), a bandwidth of the cyclic emitter signal must be 5-10 GHz. This means that one emitter must scan the specified range of 10 GHz in 20 µs. The linear chirp method is the most suitable for solving this problem.

The received signal must be digitized and processed. A 2-dimensional Fourier transformation is used, which imposes restrictions on the choice of processor. An FPGA (Field Programmable Gate Array) was chosen, which allows receiving digitized data in the pipeline mode, process it at the same bit rate and transfer an already prepared image to the next processor.

The next processor provides a confidence value corresponding to the detected concealed item of interest and a numeric representation corresponding to said detected concealed item.

Figure 5:
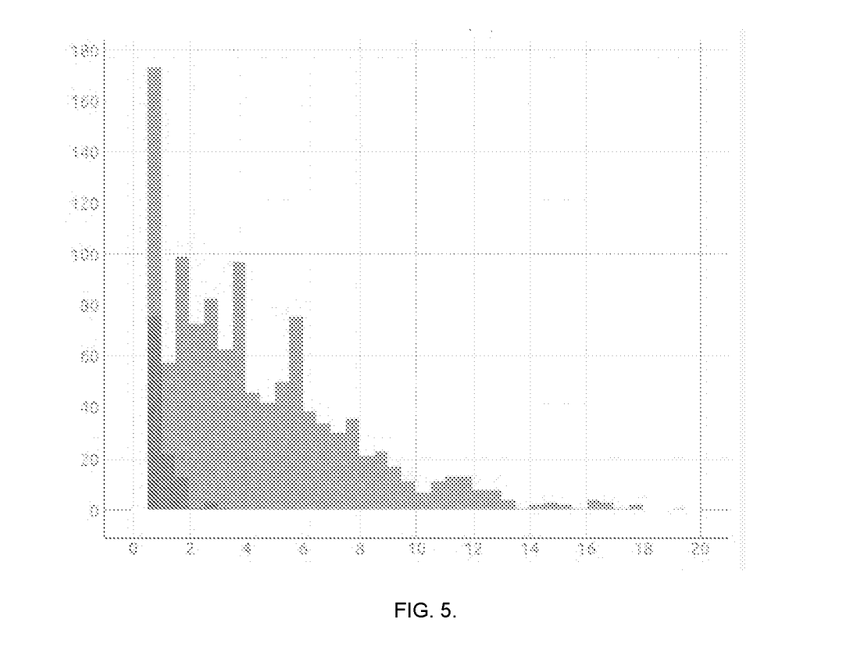
FIG. 5 shows an example distribution of anomalies detected by the present invention for a target with an object of interest (lighter part of the histogram) and a target without any object of interest (dark part of the histogram in the left part of the figure).

In general, the number of anomalies obtained (i.e., the track length obtained) during the passage of a target comprising dielectric objects on the body will significantly exceed the number of anomalies obtained during the passage of a target which does not comprise dielectric objects (see FIG. 5). When passing without dielectric objects on the body, the device should, generally, detect no more than two anomalies during the entire time of passage. In contrast, when a target with dielectric objects is passing through the device, up to 20 anomalies may be detected. FIG. 5 shows an example distribution of track lengths of anomalies detected during the passage of a target without dielectric objects on the body (dark part of the histogram in the left part of the figure) and a target with a dielectric object (e.g., plasticine) strapped to its legs (lighter part of the histogram).

PM Subsystem.

The inventive device further includes a passive magnetometer subsystem that allows the detection of objects having a residual magnetization. The PM subsystem comprises, e.g., 20 (10 per side pillar) 3-axis MagDRV type magnetic field sensors positioned along the side pillars, as well as 4 MagDAQ boards serving the magnetic field sensors (i.e., digitization and power supply boards of the sensors).

The passive magnetometry technology is based on the fact that the digitized instantaneous values of the magnetic field along three mutually perpendicular axes in the sensor locations fully determine the magnetic field vector, B, in these points.

Figure 6:
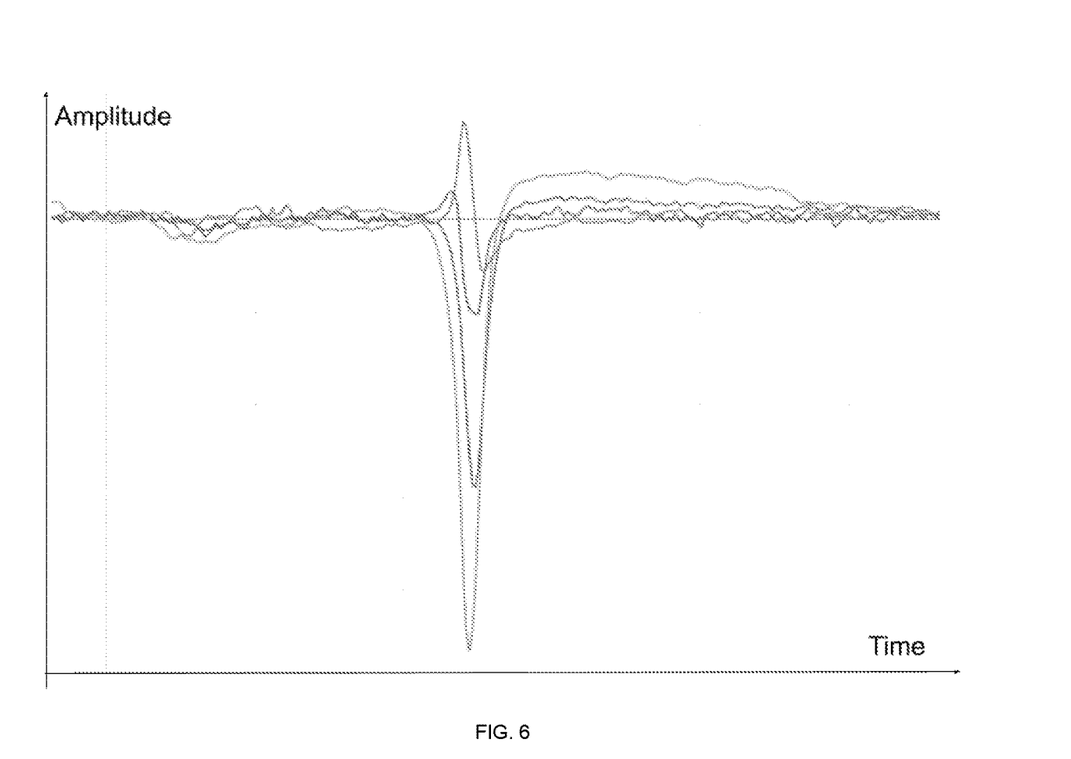
FIG. 6 shows an example of a resulting graph of the passive magnetometry system of the present invention, after a time sweep of three magnetic field components (Bx, By, Bz) from a sensor when a target with a magnetized object passes through the portal of the device. The horizontal axis shows the time, in seconds, while the vertical axis shows the value of the magnetic field component in nanoTesla (nT).

FIG. 6 shows an example of a time sweep of three magnetic field components (Bx, By, Bz) from one of the sensors when a target with a magnetized object passes through the portal of the device. The horizontal axis shows the time, in seconds, while the vertical axis shows the value of the magnetic field component in nanoTesla (nT).

After subtracting the constant component of the magnetic field (i.e., the Earth's magnetic field), the PM subsystem determines the magnetic field created by magnetized objects located nearby, which, in the first approximation, can be considered as point magnetic dipoles with a magnetic moment, m.

When a target with a magnetized object passes through the portal, the values of the measured magnetic field first increase and then decrease (as shown in FIG. 6). The distribution of field values between components, Bx, By, and Bz, depends on the location of the magnet, its strength, and the orientation of its dipole moment in space.

The magnetic field, B, created by the magnetic dipole, m, at distance, r, in the direction determined by the unit vector, n, is given by the formula, $B(r)=[3n(n,m)-m]/r^3$ (See, e.g., Jackson J. D. Classical Electrodynamics. 2nd ed., John Wiley & Sons, New York, 1975, p. 182).

In the PM subsystem of the invention, the field, B, is measured at a large number of points (i.e., at the locations of the sensors). Then, the inverse problem of determining the coordinates (x, y, z) and the dipole moment components (mx, my, mz), which could cause such a magnetic field, is solved numerically/mathematically. Finally, if the value of the calculated vector, m, exceeds a threshold value, an anomaly is generated and further processed in the same way as the anomalies obtained from the MDD subsystem. Such further processing is discussed below.

Data Processing Algorithms and Software Composition.

The principle of data processing and receiving signals on the detection of an object of interest (i.e., an anomaly) is as follows.
1. At the first stage, there is a screening for anomalies, which are manifestations of the presence of objects of interest detected by either the MDD subsystem or the PM subsystem.

2. Then, each type of anomaly is collected into separate groups to create tracks having lengths, which are collections of similar anomalies of a given type from the neighboring consecutive frames.

3. Finally, if at any point, the track length reaches a threshold value, an alarm is issued signaling the detection of an object of interest.

The software of the prototype consists of four separate programs, working under Linux open-source OS, and having the following functionalities:
1. hss_pfdev: providing microwave images from the system.
2. hss_rfpipeline: detecting anomalies from microwave images.
3. hss_gspipeline: obtaining video images from cameras.
4. hss_server: receiving anomalies using the PM subsystem, aggregating all received anomalies into tracks, and issuing a detection signal.

Figure 7:
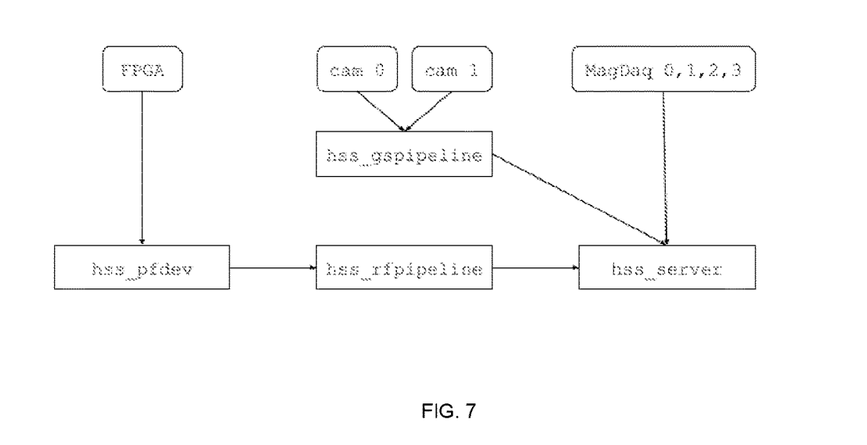
FIG. 7 shows the software interaction diagram of the present invention.

The programs, hss_pfdev, hss_rfpipeline, and hss_gspipeline, run on side pillar-mounted embedded computers, and the program, hss_server, runs on the arch computer. The software interaction diagram is shown in FIG. 7. The software is preinstalled on the device as executable files, and it is automatically launched at power-up.

The invention generally comprises:
1. A system and device for detecting and classifying items concealed on the body of a moving or stationary person, as well as in carried or wheeled luggage, in real time. The following techniques may also be utilized:
cyclic scanning of a broadband radio wave signal of an inspection area by multiple stationary distributed transmitters. Receiving scattered and direct broadband radio wave signals by a set of fixed distributed receivers. The transmitters/emitters and receivers/sensors are positioned on each of two side pillars which are connected via an overhead beam (i.e., an arch). This structure forms a portal, said portal comprising the two side pillars electronically connected with the overhead beam, said portal thus forming an inspection area. Each one of said two side pillars comprise linear vertical arrays of 16-124 millimeter-wave emitters and 8-124 millimeter-wave receivers, one or more magnetometers, and two or more video cameras. The system further comprises a power input system and a calculation processor. Said emitters transmit cyclic broadband radio wave signals towards the inspection area, said receivers sensing said broadband radio wave signals after they are either transmitted through or scattered by the target and/or any objects. The broadband radio wave signals are either unimpacted direct signals or scattered signals which have been redirected or otherwise affected after impacting the target moving through said inspection area. Said receivers then send the sensed data to said calculation processor, said Imaging processor then providing one or more 2-dimensional images of said target based on said unimpacted direct signals and said scattered signals. Said calculation processor further analyzes said sensed data, to select one or more sections of said one or more 2-dimensional images, said one or more sections corresponding to a detected concealed item of interest. The one or more magnetometers provide supplemental magnetic field data to said processor for said analyzing, e.g., for further confirmation of an item of interest. Said one or more video cameras provide for tracking of said concealed item of interest perhaps even beyond the inspection area. Additional optical sensors may also be utilized in the device;

drawing a set of two-dimensional images of the human target and luggage based on scattered and direct radio wave signals;
analysis of the radio wave image stream with the selection of image sections, corresponding to the hidden objects (anomalies) and obtaining their characteristics;
supplementing the characteristics of a moving or stationary person or object obtained as a result of the above analysis with data from other sensors, such as magnetometers, optical sensors (video cameras, stereo cameras, depth sensors, sensors of presence in the area, etc.);
classifying objects based on a set of their characteristics.

The system and device further allow for embodiments comprising inter alia the following options.
1. Cyclic scanning with cycle time of the order of a millisecond broadband (with a bandwidth of a one to ten GHz) millimeter range radio-wave signal with a given frequency switching of the inspection area by many stationary transmitters.
2. Cyclic scanning with separation of transmitters:
Including time division of transmitters,
including separation of transmitters by frequency, or
a combination of both methods.
4. Cyclic scanning with transmitter placement comprising:
full height (height), adjacent, about 1.5-2.5 m, or
Height step, equally spaced and positioned every few cm (i.e., 2-3 cm) from one another.
Hence the device's linearity-minimum number (cycle time requirement) with minimum pitch and full height.

Transmitters are located on different sides of the human movement area to obtain cross-sectional images from different viewing angles (aperture synthesis, on the X-Y axes)—"portal" configuration.
5. Cyclic scanning in one or two orthogonal polarizations of the radio wave signal (Co and cross polarization).

The image stream is multichannel, with the following options:
1) if one polarization is utilized, for example (the image can be represented as a colored image in some color coding scheme, e.g., HSV), wherein:
   a) channel A: provides data as a gradient of brightness based on characteristics of the scattered or transmitted signals received;
   b) channel B: provides data based on a characteristic of the speed of movement of the target/scatterer of signals;
2) if two orthogonal polarizations are utilized (the image can be represented as a colored image or as a set of images in some color coding scheme, e.g., RGB), wherein:
   a) channel A: provides data as a gradient of brightness based on characteristics of the scattered or transmitted signals received;
   b) channel B: provides data based on a characteristic of speed of movement of the target/scatterer of signals;
   c) channel C: provides data as a co-linear vertical polarization based on characteristics of the scattered or transmitted signals received;
   d) channel D: provides data as a cross-linear polarization based on characteristics of the scattered or transmitted signals received;
   e) channel E: provides data as a co-linear horizontal polarization based on
characteristics of the scattered or transmitted signals received.

6. Reception of scattered and direct broadband radio wave signals.

Multiple fixed receivers located on different sides of the area of human movement as the person and luggage (moving target) move through the inspection area to image stream formation.

7. Receipt of scattered and direct broadband radio wave signals with separation of the phase of these signals (coherent signal reception method).
8. Receipt of scattered and direct broadband radio-wave signals in two orthogonal polarizations of the radio-wave signal (Co and cross polarization).
9. Reception of scattered and direct broadband radio wave signals with positioning of receivers:

full height (height), adjacent, about 1.5-2.5 m, or height step, equally spaced a few cm (i.e., 2-3 cm) from one another.

10. Construction of a set of two-dimensional images of human body and luggage based on scattered and direct radio wave signals with location of transmitters and receivers on different sides of human movement area, when in each pillar contains receivers and transmitters, there are to obtain cross-eyed images from different viewing angles.
11. The analysis of multiple two-dimensional images of human body and luggage based on scattered and direct radio wave signals with selection of image sections corresponding to hidden objects (anomalies), e.g.:

including the search for patterns (anomalies) in images or image flows (detection);

including the use of image areas, containing the pattern/anomaly of interest (segmentation);

including the use of the position of anomalies of interest in a series (streams) of images (tracking);

including when the anomaly of interest is a combination of brightnesses and colors of the image areas, including when the brightnesses of the image areas correspond to the intensity of scattering in this area, and the color of the area corresponds to the speed and direction of movement of the objects in this area;

including the use of the information about the location of detected anomalies in the image in the form of coordinates (pixels) of the corners of the rectangles containing them (ROI-region of interest) or coordinates of one of their corners, widths and heights, and the degree of confidence in the correctness of finding patterns;

including the addition to the information about the anomaly position and confidence in the correctness of finding the anomaly of the additional information, obtained from the microwave images analysis (features);

including forming for each anomaly an array of numbers containing the numeric representation of this information;

including when this additional information is obtained by calculating at least one of the following image characteristics: maximum and/or minimum values, mean values, median values, standard deviation for brightness and/or velocity;

including when such characteristics are determined including the entire area (ROI) of the anomaly, and/or areas inside, outside, as well as within individual parts of the ROI, including left side, right side, top side, bottom side, middle side, above ROI, below ROI, left side of ROI, right side of ROI within image areas whose dimensions are either preset as parameters (number of pixels by width and/or height) or determined depending on the size and/or position of the ROI as a specified proportion of the width and/or height of ROI.

12. Optical image flow analysis (cameras, stereo pairs, TOF . . . ) e.g.:

including search for objects in images or in image flows (detection);

including recognize types of objects in images, such as people, body parts, carried luggage, wheeled luggage, animals, etc.;

including markup areas of images containing recognized objects (segmentation);

including tracking the position of objects of interest in a series (streams) of images (tracking);

including with obtaining additional information about the movement of a person and/or objects through the system, their position, speed, number, type, etc.;

including when this additional information is obtained from the analysis of video images;

including when this additional information is obtained from depth map analysis;

including when this additional information is tracking parameters of a moving object;

including when the tracks are generated from numerical representations of such information with reference of such tracks to specific persons and/or objects.

13. Use of multiple fixed fluxgate magnetometers, located on different sides of a person's movement area to continuously monitor distortion of the Earth's magnetic field as a person and luggage move through the screening area to obtain additional information about magnetized objects on a person's body and in luggage in the screening area, e.g.:

including the use of single-axis and/or dual-axis and/or triple-axis magnetometers;

including the use of fluxgate magnetometers;

including the detection of the presence of magnetized objects on the human body or in luggage;

including the use of the fact of the presence of magnetized objects on the human body or luggage as an indication of the possible presence of firearms or cold steel;

including the formation of a track of such signs as a person passes through the system.

14. Combining track data from radio image analysis, optical image analysis, and magnetometer data, e.g.:

including joint analysis of track parameters of a moving object derived from analysis of radio images from one or different sides of the portal;

including joint analysis of moving object track parameters obtained from the analysis of optical images from one or different sides of the portal;

including joint analysis of parameters of radio and optical images of a moving object obtained from the same or different sides of the portal;

including joint analysis of parameters of radio and optical images of a moving object obtained from one or different sides of the portal with addition of track parameters obtained from analysis of magnetometer data;

including the formation of an array of numbers characterizing the parameters of the moving object track ("passage"), taking into account the above joint analysis, where in each position of the array there is a number characterizing a fixed parameter (feature).

15. Classifying tracks of moving people ("passes") using arrays of numbers containing the results of joint analysis, e.g.:

including the methods of binary classification to the class of passages of interest and passages of no interest;

including the methods of classification to more than two classes of passages, among which is at least one class of the passages of interest and at least one class of passages of no interest;

including output of the signal about the passages belonging to a certain class;

including issuing of sound signal, light signal, image (photo, video stream) of a person or detected object with the frame superimposed on it, or on or any combination of the above signals;

including the output of an image of a person or a detected object with a frame superimposed on it, color, line thickness, fill type, shape or any combination thereof corresponds to the class of the detected object according to predefined or configurable matching rules;

The invention may comprise any one or more of the following methods of radiation:

linear frequency sweep from 10 to 20 GHz in a time of 16 µs (defined as sweep up) and back (sweep down); Transmitters on one side of the gantry are only switched on with a sweep up; Transmitters on the other side of the gantry are only switched on with a sweep down;

the transmitters on the other side of the portal are only switched on by sweep up;

the transmitters on the other side of the portal are only switched on by sweep down.

Receiving methods include but are not limited to:

high-frequency mixer-feed the reference (emitted) signal and the received measure frequency, phase, and amplitude of beats after the mixer.

Processing methods include but are not limited to:

Fourier sweep by frequency-get the distance from the transmitter to the scattering point plus the distance from the scattering point to the receiver; Fourier by frame-obtain phase change rate at each scattering point; Finding maximum of the 2nd Fourier-determination of object velocity;

rectification procedure-accounting of geometry; formation of 2x-dimensional images panel (for each receiver and for each side of the portal);

obtaining an image both from its side and from the opposite side.

In essence, the invention thus comprises:

A security screening device, comprising: a power input system, a calculation processor, and a portal, said portal comprising two electronically connected side pillars, said portal forming an inspection area, each one of said two side pillars comprising a linear array of two or more millimeter-wave emitters, a linear array of one or more millimeter-wave receivers, one or more magnetometers, and one or more video cameras, said two or more millimeter-wave emitters transmitting cyclic broadband radio wave signals towards said inspection area, said one or more receivers sensing said cyclic broadband radio wave signals emitted by said two or more millimeter-wave emitters, said cyclic broadband radio wave signals being unimpacted direct signals or scattered signals after impacting a target moving through said inspection area, the calculation processor is selecting one or more sections of one or more 2-dimensional images, said one or more sections corresponding to a detected concealed item of interest, said one or more magnetometers providing supplemental magnetic field data to said calculation processor for said analyzing, and said one or more video cameras tracking said concealed item of interest.

In some aspects, said cyclic broadband radio wave signals transmitted have a bandwidth of 5-20 GHz, said signals transmitted varying in frequency.

In some aspects, said cyclic broadband radio wave signals transmitted vary in time, in frequency, or both in time and in frequency.

In some aspects, said emitters are positioned in a vertical line and with an equal spacing between one another, and wherein said receivers are positioned in a vertical line and with an equal spacing between one another.

In some aspects, said emitters transmit and said receivers sense said cyclic broadband radio wave signals in one orthogonal polarization.

In some aspects, said processor creates an image stream from said sensed data.

In some aspects, said processor provides a separation of a phase of the cyclic broadband radio wave signals.

In some aspects, said portal has a height of 1.5-2.5 meters.

In some aspects, said processor provides cross-eyed images of said target based on a location of said emitters and said receivers on both sides of said inspection area.

In some aspects, said analyzing further comprising providing a confidence value corresponding to said detected concealed item of interest.

In some aspects, said analyzing further comprising providing a numeric representation corresponding to said detected concealed item of interest.

In some aspects, said analyzing further comprising optical image flow analysis.

In some aspects, said analyzing further comprising providing one of two or more classifications for each target based on a joint analysis of optical data, magnetometer data, and radio wave data.

In some aspects, said portal further comprising an overhead beam connecting said two side pillars, said overhead beam housing, said power input system and said calculation processor.

In some aspects, each one of said side pillars further comprising a radio frequency generation, distribution and demodulation module and a data acquisition processor.

In some aspects, each one of said two side pillars comprises 16-128 of said millimeter-wave emitters.

In some aspects, said two side pillars are electronically connected via a floor cable duct.

In some aspects, said emitters transmit and said receivers sense said broadband radio wave signals in two orthogonal polarizations.

A resulting benefit of the present invention is a significantly lower cost of implementation of a security screening system. Unlike prior art square emitter arrays, which provide full 3-D images of the inspection area, the linear emitter arrays utilized in the present invention provide a sufficient 2-D image. In the 2-D image, the horizontal axis corresponds to the distance traveled by the radio wave from the emitter to the target/scatterer and from the target/scatterer to the receiver, and the vertical axis corresponds to the vertical coordinate of the target/scatterer. Since the linear emitter arrays contain less elements than a square array of the prior art, the cost of the system is reduced.

Another resulting benefit of the present invention is its easy assembly. The side pillars of the present invention are connected to the overhead beam, or to the floor cable duct, via a composite connector which allows for a simple single-click assembly and disassembly of the entire device/system.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A security screening device, comprising:
a portal, said portal comprising two electronically connected side pillars (100), said portal forming an inspection area (120),
each one of said two side pillars comprising a linear array of two or more millimeter-wave emitters (101), a linear array of two or more millimeter-wave receivers (102), a data acquisition processor (106) and an imaging processor (107),
said two or more millimeter-wave emitters being configured to transmit cyclic broadband radio wave signals towards said inspection area searching for a concealed item (22) hidden on a moving target (21),
each emitter from the linear array of emitters being configured to cyclically scan a range with bandwidth 5-20 GHz within 10-50 microseconds;
said two or more receivers being configured to sense said cyclic broadband radio wave signals emitted by said two or more millimeter-wave emitters, said cyclic broadband radio wave signals being direct signals unimpacted by the moving target, signals transmitted through the moving target and signals that are reflected back after impacting the moving target;
said two or more receivers being configured to send sensed signals to the data acquisition processor (106) located in the same pillar then the data acquisition processor sends data to the imaging processor (107) located in the same pillar, said imaging processor configured to provide one or more 2-dimensional images (25) of said moving target based on processing of said unimpacted direct signals and said signals transmitted through the moving target and said reflected signals; said one or more 2-dimensional images having optical path length resolution of better than 2 cm; and
a calculation processor (109) configured to select one or more sections of said one or more 2-dimensional images, said one or more sections corresponding to the concealed item of interest.

2. The device of claim 1, wherein said cyclic broadband radio wave signals transmitted vary in time, in frequency, or both in time and in frequency.

3. The device of claim 1, wherein said emitters are positioned in a vertical line and with an equal spacing between one another, and wherein said receivers are positioned in a vertical line and with an equal spacing between one another.

4. The device of claim 1, wherein said emitters transmit and said receivers sense said cyclic broadband radio wave signals in one linear polarization.

5. The device of claim 1, wherein the acquisition processors are configured to provide separation of a phase of the cyclic broadband radio wave signals.

6. The device of claim 1, wherein said imaging processors are configured to provide cross-eyed images of said target based on a location of said emitters and said receivers on both sides of said inspection area.

7. The device of claim 1, further comprising one or more magnetometers (104); said one or more magnetometers is configured to provide supplemental magnetic field data to the calculation processor for said selecting.

8. The device of claim 1, said calculation processor further providing a confidence value corresponding to said concealed item of interest.

9. The device of claim 1, said calculation processor further providing a numeric representation corresponding to said concealed item of interest.

10. The device of claim 1, further comprising one or more video cameras (103), said one or more video cameras is configured to track said concealed item of interest.

11. The device of claim 10, said calculation processor further providing optical image flow analysis, also providing one of two or more classifications for each target based on a joint analysis of optical data, magnetometer data, and radio wave data.

12. The device of claim 1, said portal further comprising an overhead beam connecting said two side pillars, said overhead beam housing a power input system and the calculation processor.

13. The device of claim 1, each one of said side pillars further comprising a radio frequency generation, distribution and demodulation module (105).

14. The device of claim 1, wherein each one of said two side pillars comprises 16-256 of said millimeter-wave emitters, wherein said emitters transmit and said receivers are configured to sense said cyclic broadband radio wave signals in two orthogonal polarizations.

* * * * *